United States Patent Office 2,815,137
Patented Dec. 3, 1957

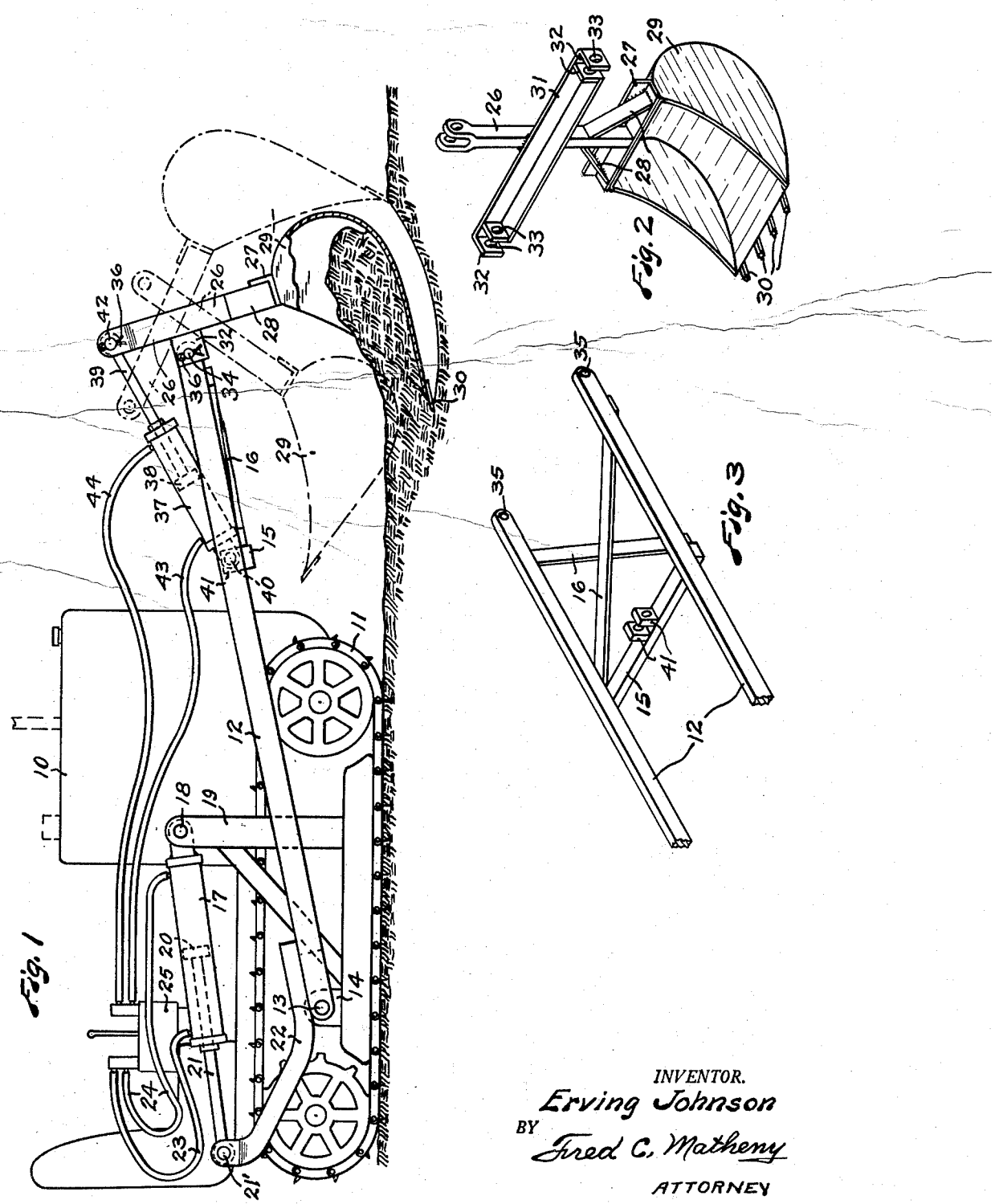

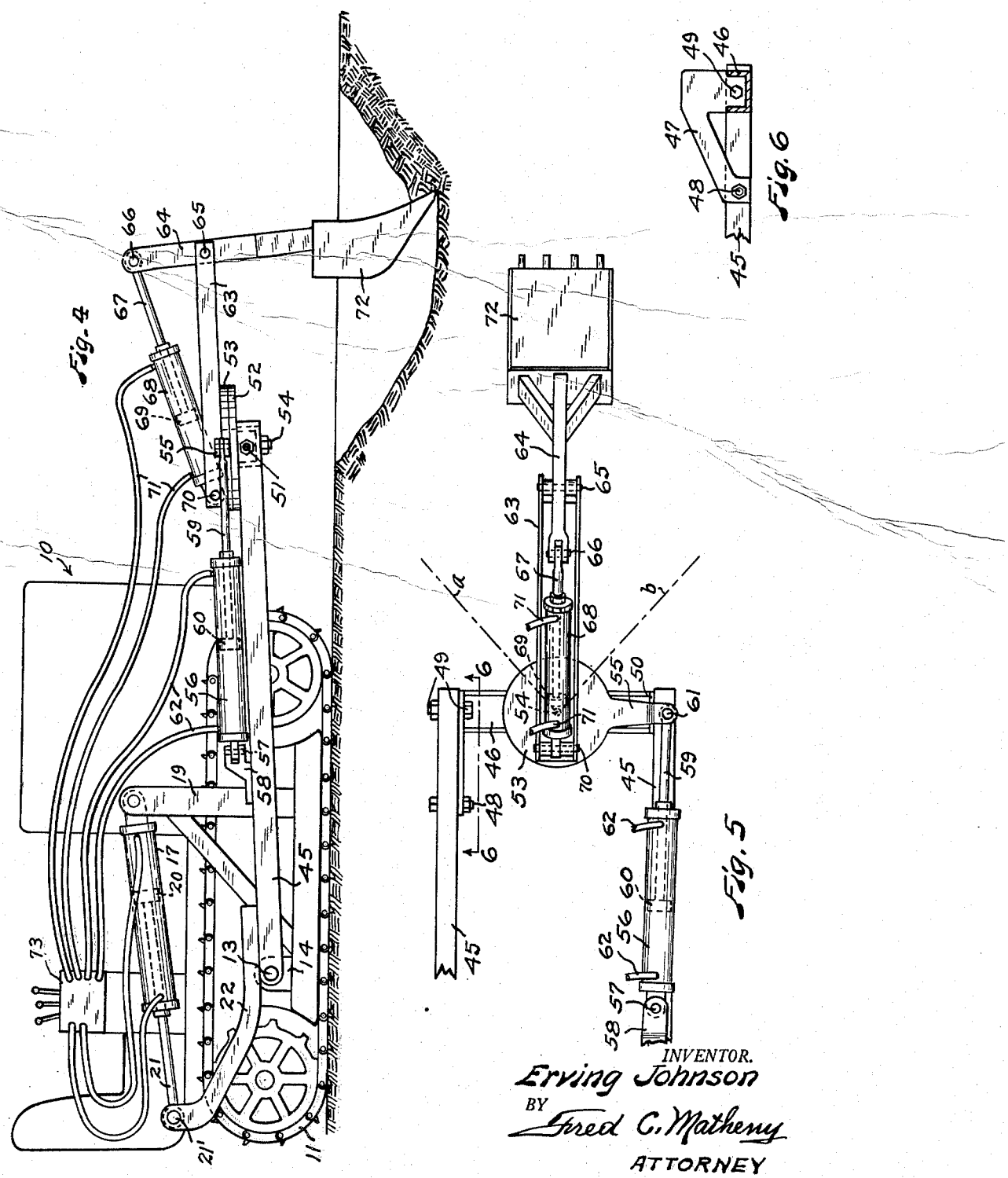

2,815,137

EXCAVATOR ATTACHMENT FOR TRACTOR

Erving Johnson, Dabop, Wash.

Application October 30, 1951, Serial No. 253,883

1 Claim. (Cl. 214—138)

This invention relates to an excavating attachment for a tractor.

An object of this invention is to provide an excavating attachment which is readily attachable to either a wheel type or an endless track type tractor to adapt the tractor for use as an earth moving machine and particularly for use in digging ditches and like work.

Another object is to provide an excavating attachment which is simple in construction, not expensive to manufacture, which can be quickly and easily installed on and removed from ordinary tractors that are equipped with bulldozing or loading equipment and which is durable and safe to use and highly efficient in operation.

Another object is to provide an excavating attachment of this type which is compact and operates close to the tractor and which does not unbalance the tractor nor make the same awkward to handle and which does not objectionably obstruct the visibility of the driver to the front of the tractor.

Another object of this invention is to provide an excavator attachment for a tractor that is equipped with two swingingly movable side arms, said excavator attachment comprising a boom, boom supporting means connected with the boom intermediate the two ends of the boom and pivotally mounting the boom on the side arms for vertical swinging movement of the boom, hydraulic cylinder and piston means operable to swingingly move the boom, and an excavating implement, such as a digger bucket fixedly attached to the lower end portion of the boom.

Other objects of this invention will be apparent from the following description taken in connection with the accompanying drawings.

In the drawings Figure 1 is a side elevation of a ditch digger constructed in accordance with this invention showing the same installed on a tractor.

Fig. 2 is a detached perspective view of a ditch digger bucket and boom with cross arm constructed in accordance with this invention.

Fig. 3 is a detached perspective view of the outer end portion of a pair of side arms which carry the bucket and boom and cross arm shown in Figs. 1 and 2.

Fig. 4 is a side elevational view showing means similar to that shown in Fig. 1 except that the boom and excavating implement shown in Fig. 3 are swingingly movable from side to side of the tractor on an upright pivot member.

Fig. 5 is a fragmentary plan view of the digger or excavator portion of the device shown in Fig. 4, the boom and excavator implement being shown in a different position in Fig. 5 than they are in Fig. 4.

Fig. 6 is a view partly in section and partly in elevation, taken substantially on broken line 6—6 of Fig. 5 and showing a bracket member.

Like reference numerals designate like parts throughout the several views.

The ditch digging attachment shown in Figs. 1, 2 and 3 is therein illustrated as applied to a tractor 10 which is equipped with endless treads or tracks 11. The tractor 10 is provided with side arms 12 of a type similar to the arms ordinarily used to support loading means or a bulldozer blade. The rear end portions of the arms 12 are connected by horizontal pivot members 13 with rigid frame parts 14 of the tractor. This mounts the arms 12 so that they can be swingingly moved vertically on the pivots 13. One side arm 12 is provided on each side of the tractor and these side arms extend forwardly alongside of the tractor and beyond the forward end of the same.

Preferably a transverse bar 15 and inclined brace or truss members 16 rigidly connect the two side arms 12 with each other forwardly of the tractor. Hydraulic means is provided, preferably in duplicate at each side of the tractor, for controlling vertical swinging movement of the two side arms 12. The hydraulic means on the right side of the tractor is shown in Fig. 1 and it will be understood that duplicate hydraulic means is provided on the left side of the tractor. The hydraulic means shown in Fig. 1 comprises a cylinder 17 having one end portion connected by a pivot member 18 with a fixed part 19 of the tractor frame. A piston 20 in the cylinder 17 is connected by a piston rod 21 and pivot member 21' with a lever arm 22 which is rigidly secured to the rear end portion of the adjacent side arm 12. Conduits 23 and 24 connect the respective end portions of the cylinder 17 with a valve 25 which controls the flow of liquid, such as oil under pressure, from any suitable source to and from the cylinder 17. The valve 25 is of conventional construction and simultaneously controls the flow of liquid to and from the cylinder 17 and to and from a similar cylinder on the left side of the tractor for simultaneous movement of the two side arms 12.

The side arms 12 support or carry excavator or ditch digger parts which comprise a boom 26 rigidly secured, as by an angle plate 27 and inclined braces 28, to the top portion of a bucket 29. The parts 26, 27, 28 and 29 may all be secured to each other by welding or the bucket 29 may be bolted to the angle plate 27 to permit removal and replacement of said bucket. The boom 26 is positioned mid way between the two sides of the bucket 29. The bucket 29 is of conventional shape and may be of any suitable width depending on the width of the ditch to be made. Preferably the bucket 29 has teeth 30 protruding forwardly from the edge thereof by which the digging is done. Also preferably the concave side of this bucket faces the tractor so that the bucket is movable toward the tractor into a filling and carrying position and away from the tractor into a dumping position.

The boom 27 is provided about mid way of its length with a cross bar 31 which is welded or otherwise rigidly secured to said boom and extends equal distances from each side of the boom. The two end portions of the cross bar 31 are provided with spaced apart bracket plates 32 having perforations 33 therein for the reception of pivot pins 34. The pivot pins 34 are also adapted to extend through holes 35 in the forward end portions of the side arms 12 to pivotally mount the boom 26 and bucket 29 on the side arms 12. Preferably cotter keys 36 are used as a readily detachable means for securing the pivot pins 34 and other similar pivot pins which have to be removed and inserted in detaching and attaching the digger mechanism.

A hydraulic cylinder 37 having the usual piston 38 and piston rod 39 is provided for swingingly moving the boom 26 and bucket 29 about the pivot pins 34. The cylinder 37 is positioned mid way between the two side arms 12 and has the end portion thereof nearest the tractor connected by a pivot pin 40 with spaced apart lugs 41 on the cross bar 15. The forward end portion of the piston rod 39 of cylinder 37 is connected by a pivot pin 42 with the forked upper end portion of the boom 26. Preferably cotter keys 36 hold pivot members 40 and 42 in place.

Two flexible liquid conduit members 43 and 44 connect opposite end portions of the cylinder 37 with the valve 25 so that an operator on the tractor can selectively control the inlet and exhaust of fluid under pressure relative to the cylinder 37.

In the operation of the ditch digger shown in Figs. 1, 2 and 3 the tractor is positioned in a line where a ditch is to be dug. The side arms 12 and boom 26 are swingingly adjusted vertically to position the toothed edge of the bucket 29 on the ground or in a ditch at a location, for instance, as shown by dot and dash lines at the right in Fig. 1. The boom 26 is then further moved clockwise toward the position in which it is shown by full lines in Fig. 1. This causes the bucket to dig into the ground. Also while the bucket is thus positioned to dig or scoop into the ground the tractor may be moved backwardly to help fill the bucket with earth. After the bucket 29 is substantially filled with earth it may be further moved toward the tractor into a carrying position, as shown by dot and dash lines at the left in Fig. 1. The side arms 12 may then be swingingly raised to elevate the bucket any desired distance above the ground and the tractor may be moved to a desired location and the bucket dumped by swingingly moving it counterclockwise about the pivots 34, as respects the showing in Fig. 1. The tractor may then be moved back into line with the ditch and the operation repeated. As a ditch is deepened the bucket is operated down in the ditch until the limits of clearance afforded by side arms 12 and cross bar 31 are reached.

The filling of the bucket 29 is partly an instroke movement in which the bucket is swingingly moved toward the tractor and may be partly accomplished by backing up the tractor while the bucket is in a filling position. Dumping is accomplished by swingingly moving the bucket outwardly away from the front of the tractor.

Figs. 4, 5 and 6 show a form of the invention in which an earth moving or excavating device such as a bucket or shovel is mounted so that it is swingingly movable both vertically and horizontally relative to the tractor. This involves the use of means, such as a turntable movable on a vertical pivot, and makes possible side casting or loading of dirt or delivery of dirt to either side of the tractor or to either side of a ditch without moving the tractor each time a bucket or shovel full of dirt is to be discharged.

The mechanism shown in Figs. 4, 5 and 6 comprises two spaced apart side arms 45 which correspond to the previously described side arms 12 and are similarly positioned and mounted alongside of a tractor. The side arm 45 are movable in the same manner as the side arms 12 but do not extend as far forwardly of the tractor as do the side arms 12. The devices shown in Fig. 4 for supporting and moving the side arms 45 are the same as those shown in Fig. 1 and hereinbefore described and the parts thereof are similarly numbered.

A cross bar 46, which may be a piece of channel iron, extends crosswise between the forward end portions of the side bars 45. Preferably a bracket 47 is welded to one end of the cross bar 46 and extends back along the adjacent side bar 45 and is secured to said side bar 45 by two bolts 48 and 49. A web member 50 is welded to the other end of the cross bar 46 and is secured to the other side bar 45 as by a bolt 51. The bracket 47 prevents the cross bar 46 from turning on the bolts 49 and 51.

A non-rotatable turntable member 52 is welded or otherwise fixedly secured to the cross bar 46 mid way between the two ends thereof and parallel with the common plane of the two side arms 45. A rotatable turntable member 53 rests on the non-rotatable turntable member 52 and is pivotally connected therewith by an axial bolt 54 which is perpendicular to the two turntable members and may also extend through the cross bar 46. A lever arm 55 is rigid with the upper turntable member 53 and extends sidewise therefrom. A hydraulic cylinder 56 has one end portion connected by an upright pivot member 57 with a bracket 58 which is fixedly secured to the side arm 45 at the side of the tractor toward which the lever arm 55 extends.

A piston rod 59 has one end fixedly secured to a piston 60 in the cylinder 56 and the other end connected by a pivot member 61 with the outer end of the lever arm 55. Conduits 62 connected with opposite end portions of the cylinder 56 provide for the admission to and exhaust from said cylinder 56 of liquid under pressure. Conduits 62 connect with a valve 73 which is under the control of the operator of the tractor. A beam type boom supporting arm 63, which may be a channel bar, is welded or otherwise rigidly secured to the upper turntable member 53 and extends forwardly therefrom. A boom 64 similar to the previously described boom 26, is connected intermediate its two ends by a horizontal pivot member 65 with the outer end portion of the boom supporting arm 63. The upper end portion of the boom 64 is connected by a pivot member 66 with the outer end of a piston rod 67. The piston rod 67 extends into a cylinder 68 and has a piston 69 thereon. The end of the cylinder 68 toward the tractor is connected by a horizontal pivot member 70 with the boom supporting arm 63. Conduits 71 are connected with opposite end portions of the cylinder 68 and provide means through which liquid under pressure may be admitted to and exhausted from the cylinder 68.

A shovel 72, as shown in Figs. 4 and 5, or a bucket like the bucket 29 shown in Figs. 1 and 2 may be rigidly secured to the lower end portion of the boom 64.

The conduits 62 and 71 of Figs. 4 and 5 are connected with the valve 73 so that the driver on the tractor can control cylinder 68 to swingingly move the boom 64 on the pivot 65 and can control the cylinder 56 to swingingly move the parts mounted on turntable member 53 about the upright pivot member 54. Thus the arm 63 and boom 64 and shovel 72 may be swingingly moved to either side of the center line of the tractor, as indicated by dot and dash lines *a* and *b* in Fig. 5.

The shovel 72 shown in Figs. 4 and 5 is adapted for out-stroke work, that is movement away from the tractor on the digging stroke. The bucket 29 shown in Figs. 1 and 2 is adapted for instroke filling movement.

The foregoing description and accompanying drawings clearly disclose what I now regard as a preferred embodiment of my invention but it will be understood that this disclosure is merely illustrative and that changes may be made within the scope of the following claim.

I claim:

In excavating apparatus for attachment to a tractor, two side arms positioned at opposite sides of the tractor and extending beyond the forward end of the tractor; horizontal pivot means pivotally connecting the rear end portions of said side arms with the tractor frame; devices operable to swingingly move said side arms vertically; a cross bar rigidly connecting said two side arms forwardly of the tractor; a turntable member rigidly secured to said cross bar mid way between and parallel to said two side arms; another turntable member rotatively mounted on said rigidly secured turntable member; a lever arm rigid with said rotatively mounted turntable member and extending sidewise therefrom; hydraulic cylinder and piston means operatively connected between said lever arm and one of said side arms for rotatively moving said rotatively mounted turntable member; a boom supporting arm secured to said rotatively mounted turntable member and extending radially outward therefrom in a plane parallel with the plane of the side arms; a boom; horizontal pivot means connecting the forward end portion of said boom supporting arm with said boom intermediate the two ends of the boom; other hydraulic cylinder and piston means operatively connected between said boom carrying arm and the upper end portion of said boom for swingingly moving said boom about said horizontal pivot means; and a digging implement rigid with the lower end portion of said boom.

References Cited in the file of this patent

UNITED STATES PATENTS

| Number | Name | Date |
|---|---|---|
| 418,311 | Cross | Dec. 31, 1889 |
| 2,268,689 | Andrus | Jan. 6, 1942 |
| 2,323,434 | Williams | July 6, 1943 |
| 2,387,764 | Maxwell | Oct. 30, 1945 |
| 2,427,968 | Hoover | Sept. 23, 1947 |
| 2,506,759 | Wommer | May 9, 1950 |